United States Patent
Cha et al.

(10) Patent No.: US 8,885,773 B2
(45) Date of Patent: Nov. 11, 2014

(54) RADIO ARCHITECTURE FOR AN ULTRA LOW POWER RECEIVER

(75) Inventors: Choong Yul Cha, Richardson, TX (US); Kenneth K. O, Plano, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 27 days.

(21) Appl. No.: 13/092,880

(22) Filed: Apr. 22, 2011

(65) Prior Publication Data

US 2012/0114079 A1 May 10, 2012

Related U.S. Application Data

(60) Provisional application No. 61/327,008, filed on Apr. 22, 2010.

(51) Int. Cl.
*H03D 1/24* (2006.01)
*H04L 27/227* (2006.01)
*H04L 27/00* (2006.01)

(52) U.S. Cl.
CPC ..... *H04L 27/2272* (2013.01); *H04L 2027/0055* (2013.01); *H04L 2027/0028* (2013.01)
USPC ........... 375/322; 375/327; 375/345; 375/375; 375/376; 375/344

(58) Field of Classification Search
CPC ................. H04L 27/2272; H04L 2027/0055; H04L 2027/0028
USPC ......... 375/322, 340, 327, 344, 345, 375, 376; 327/58, 158; 330/51, 278, 306, 310
See application file for complete search history.

(56) References Cited

U.S. PATENT DOCUMENTS

| | | | | |
|---|---|---|---|---|
| 4,605,904 A * | 8/1986 | Hajj-Chehade | ............... | 329/325 |
| 5,109,532 A * | 4/1992 | Petrovic et al. | .............. | 455/63.1 |
| 7,486,145 B2 * | 2/2009 | Floyd et al. | .................... | 331/1 A |
| 7,512,378 B2 * | 3/2009 | Rofougaran et al. | ........... | 455/20 |
| 7,937,058 B2 * | 5/2011 | Rahman et al. | ............... | 455/307 |
| 8,331,898 B2 * | 12/2012 | Waters et al. | .............. | 455/343.1 |
| 2011/0064165 A1 * | 3/2011 | Bae et al. | ...................... | 375/319 |

* cited by examiner

*Primary Examiner* — Dhaval Patel
(74) *Attorney, Agent, or Firm* — Winstead PC

(57) ABSTRACT

An ultra low power radio receiver architecture based on phase locked loop is provided. Embodiments of an ultra low power radio receiver architecture based on phase locked loop can detect a complex modulated MSK signal with only a single path receiver chain. According to an embodiment of the present invention, the overall power consumption of the radio receiver in the present invention can be reduced by almost fifty percent compared to that of the conventional complex path radio receiver architecture. The radio receiver architecture of the invention is suitable for the ultra low power radio application such as wireless sensor networks (WSN).

13 Claims, 4 Drawing Sheets

RADIO ARCHITECTURE FOR AN ULTRA LOW POWER RECEIVER

CROSS-REFERENCES TO RELATED APPLICATIONS

This application claims priority from U.S. Provisional Patent Application No. 61/327,008 filed Apr. 22, 2010, which is hereby incorporated by reference as if fully set forth herein.

STATEMENT REGARDING FEDERALLY SPONSORED RESEARCH

This invention was made with government support under grant no. FA8650-10-M-1856 awarded by the Air Force Research Laboratory. The government has certain rights in the invention.

BACKGROUND OF THE INVENTION

A wireless sensor network (WSN) consists of spatially distributed autonomous sensors that cooperatively monitor physical or environmental conditions, such as temperature, sound, vibration, pressure, motion or pollutants. WSNs are used in many industrial and civilian application areas, including industrial process monitoring and control, machine health monitoring, environment and habitat monitoring, healthcare applications, home automation, and traffic control. Each wireless sensor node in a WSN is typically equipped with sensors, a radio transceiver or other wireless communications device, a small microcontroller, and an energy source, usually a battery. For a WSN application, the use of an ultra low power wireless sensor node is an important way to gather and manipulate information from the sensor for a sufficiently long period with a limited battery energy source after initial installation. Among the components inside a wireless sensor node, the wireless radio transceiver generally consumes most of the power since its operation frequency is in the range from hundreds MHz to several GHz.

IEEE 802.15.4 is the standard that is used for the WSN application. IEEE 802.15.4 (Low Rate WPAN) and its variant Zigbee, an industry standard, deals with low data rate but very long battery life (months or even years) and very low complexity. The first edition of the 802.15.4 standard was released in May 2003. The ZigBee set of high level communication protocols is based upon the specification produced by the IEEE 802.15.4 taskgroup. Minimum Shift Keying (MSK), a kind of Offset Quadrature Phase Shift Keying (OQPSK) is used as the modulation scheme of IEEE 802.15.4. For the generation of MSK modulated signal, a set of complex reference signals are required. Thus, for the demodulation of the MSK modulated signal, a complex reference signal is also needed.

FIGS. 1A and 1B show the conventional heterodyne and homodyne radio receiver architecture respectively for complex modulated signal detection. The heterodyne radio transceiver architecture has been popular for the implementation of radio transceiver with many discrete and partially integrated circuit components. As shown in FIG. 1A, the heterodyne radio receiver architecture 10 consists of multiple components including a radio frequency filter 11, an input matching network 12, two complex mixers 14 and 16, two complex variable gain amplifier (VGA)/low-pass filter (LPF) components 15 and 17, a low noise amplifier (LNA) 13, and a complex analog-to-digital (A/D) converter 18, which outputs a signal in I/Q (in-phase and quadrature-phase) format. The heterodyne architecture also consists of two local oscillator signal (LO) buffers 19A and 19B. However, this complicated heterodyne radio architecture is not adequate for an ultra low power radio application like WSN.

On the other hand, the homodyne radio architecture 20 in FIG. 1B is more simplified in its architecture than the heterodyne radio architecture and consists of a radio frequency filter 21, an input matching network 22 and a LNA 23. It also requires a complex mixer 24, a complex VGA/LPF 25 and a complex A/D converter 28 as the power consuming function blocks. The A/D converter 28 outputs the signal in I/Q format. The power consumption of a homodyne receiver is reduced significantly compared to the heterodyne architecture and is also adequate for the implementation of the intensively integrated radio receiver.

However, the homodyne architecture in FIG. 1B has its limitations for the implementation of an ultra low power radio receiver. As shown in FIG. 1B, a LNA 23, a complex mixer 24 and its complex local oscillator signal (LO) buffer 29, which operate at a very high frequency and consume the most power, are the main architectural defects of the homodyne radio architecture when used for an ultra low power application. Recently, there were some research reports that removed the power consuming high frequency LNA with marginal amounts of noise performance degradation. Even with this mixer-first homodyne receiver architecture, having a complex mixer and its complex LO signal buffers, a complex VGA/LNA, and a complex A/D converter limit the power efficiency of a homodyne architecture-based receiver, because they are required for the detection of a complex signal. Essentially, a complex signal path receiver consumes almost two times more power than a single path receiver since a complex signal path receiver has two single path receiver chains for the complex I/Q (in-phase and quadrature-phase) signal detection. However, a single path receiver cannot be used for the radio systems using a complex modulation like a MSK (minimum shift keying) modulation because it causes loss in detection.

In summary, there is a need for an IEEE 802.15.4 compliant wireless receiver which has low power consumption and at the same time has good noise and signal-to-noise performance.

SUMMARY OF THE INVENTION

An embodiment of the invention is directed to an ultra low power radio receiver architecture that can detect a complex modulated signal with a single path receiver.

An embodiment of the invention is directed to a radio architecture that provides almost fifty percent power reduction compared to the conventional radio receiver architectures.

A further embodiment of the invention is directed to an ultra low power radio receiver that is based on a phase locked loop, which makes complex signal detection possible with a single path receiver.

According to an aspect of this invention, the requirement of frequency stability for proper complex signal detection is far less than that of the homodyne radio receiver, which makes possible the use of on-chip or low cost crystal frequency reference.

DETAILED DESCRIPTION OF EXEMPLARY EMBODIMENTS

An embodiment of the invention is directed to an ultra low power radio receiver architecture that can detect a complex modulated signal with a single path receiver and thereby provide almost fifty percent power reduction compared to the conventional homodyne radio receiver architecture.

An embodiment of the invention is directed to the detection of MSK signals. The MSK modulated signal adopted for the low power radio system such as IEEE 802.15.4 and Zigbee is described below.

MSK signal can be represented mathematically as (1).

$$s(t) = \cos\left[2\pi f_c t + b_k(t)\frac{\pi t}{2T} + \phi_k\right] \quad (1)$$

where $b_k(t)$ is +1 when $a_I(t)=a_Q(t)$ and −1 if they are of opposite signs, and $\phi_k$ is 0 if $a_I(t)$ is 1, and $\pi$ otherwise, and $a_I(t)$ and $a_Q(t)$ is the original data standing for in-phase and quadrature phase variation, and $f_c$ and T represents the carrier frequency and the period of data.

Figure 1A:
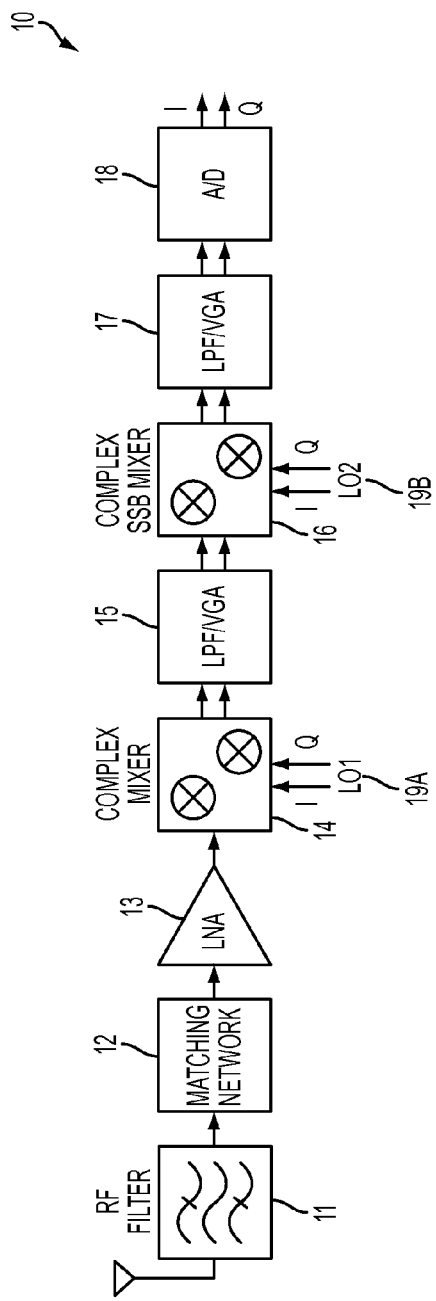
FIGS. 1A and 1B show a conventional heterodyne radio receiver architecture and a conventional homodyne radio receiver architecture as known in the prior art, respectively.
Figure 1B:
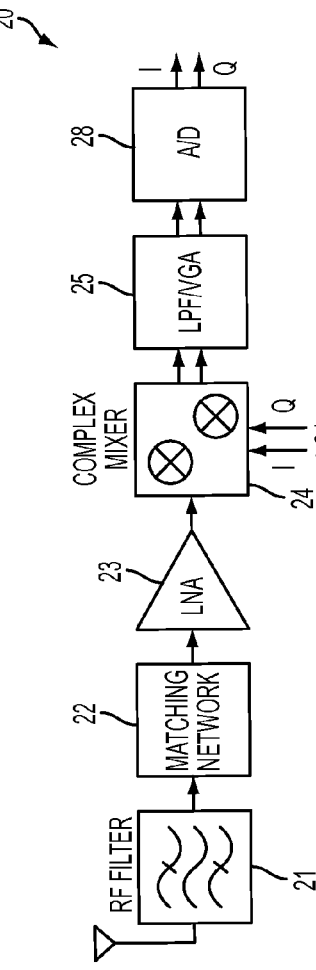
Figure 2A:
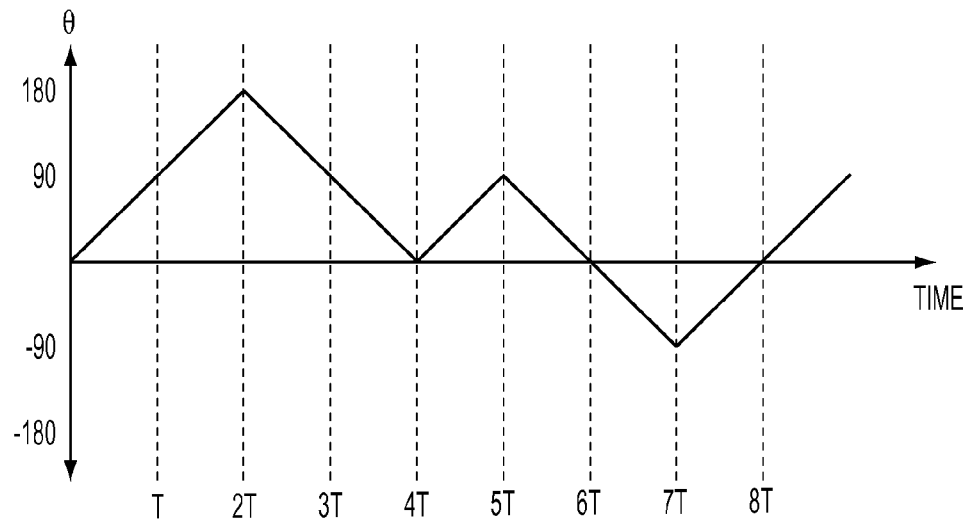
FIGS. 2A and 2B show the phase variation and phase slope in MSK (minimum shift keying) modulated signal, respectively.
Figure 2B:
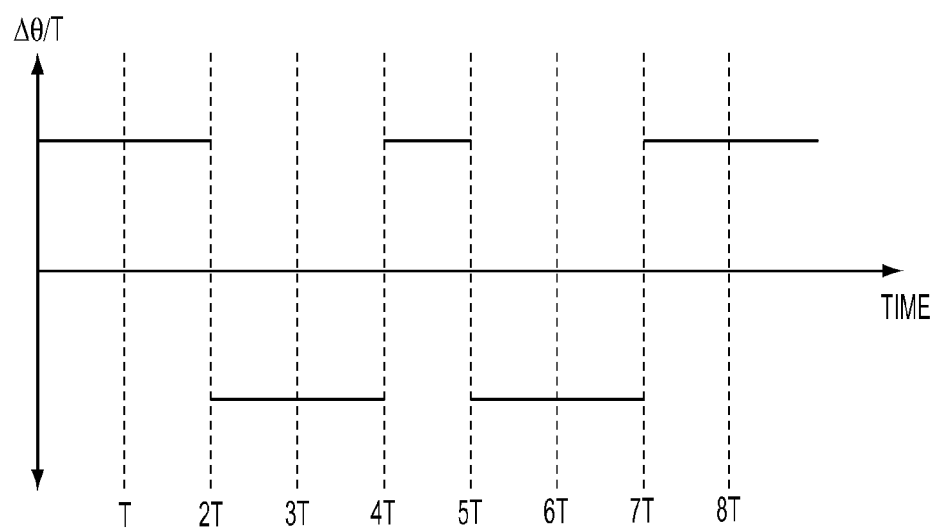

The MSK signal is a frequency and phase modulated signal with constant envelope, where the phase changes continuously and linearly. FIG. 2A shows an example of the phase variation of a MSK modulated signal. As shown in FIG. 2A, MSK signal has a linear phase variation in each data period and its phase changes 90° during a data period. Depending on the input data pattern, the linearly varying phase can change its slope from positive to negative or from negative to positive. Thus, its phase slope can be represented as a continuous square wave. As shown in FIG. 2B, the phase slope of MSK signal has a constant value and changes its polarity. Since the data information of MSK signal is contained in its phase information, the original data can be recovered by detecting its phase information.

An embodiment of the invention is directed to a receiver for decoding data from an analog signal, the receiver comprising a matching network component, a combination mixer/phase detector component, a first amplifier component, a first combination filter/amplifier component, a filter component, an oscillator component, and a second amplifier component, wherein the arrangement of the components forms a phase locked loop architecture.

In certain embodiments of the invention, the receiver further comprises a second combination filter/amplifier component.

In other embodiments of the invention, the receiver further comprises an analog-to-digital converter component.

In an embodiment of the invention the first amplifier component is a low noise amplifier.

In another embodiment of the invention, the first filter/amplifier component comprises a low pass filter and a variable gain amplifier.

In an embodiment of the invention, the filter component is a loop filter that is either an amplifier-based loop filter or charge-pump based loop filter.

In certain embodiments of the invention, the second amplifier component used in the radio architecture is a buffer amplifier.

In an alternate embodiment of the invention, the receiver comprises a limiter component in place of the analog-to-digital converter component.

In some embodiments of the invention, the input signal to the loop filter is selected from the group consisting of a first LPF/VGA output, second LPF/VGA output or a limiter output.

Embodiments of the invention are directed to a transceiver comprising a receiver in accordance with the invention and a transmitter having a digital part, including a modulator, integrated with the receiver's digital decoder, and an analog part integrated with the receiver's analog front end.

An embodiment of the invention is directed to a wireless personal area network comprising a plurality of transceivers according to the invention, wherein each transceiver is arranged in operative wireless communication with at least one other of the transceivers.

An embodiment of the invention is also directed to a method of decoding data from an analog signal, the method comprising: (i) receiving the analog signal; (ii) amplifying the analog signal; and (iii) converting the analog signal into a digital signal using the receiver of the claimed invention. In certain embodiments, the signal is a MSK signal, a FSK signal, a GMSK signal or a PSK signal.

Figure 3:
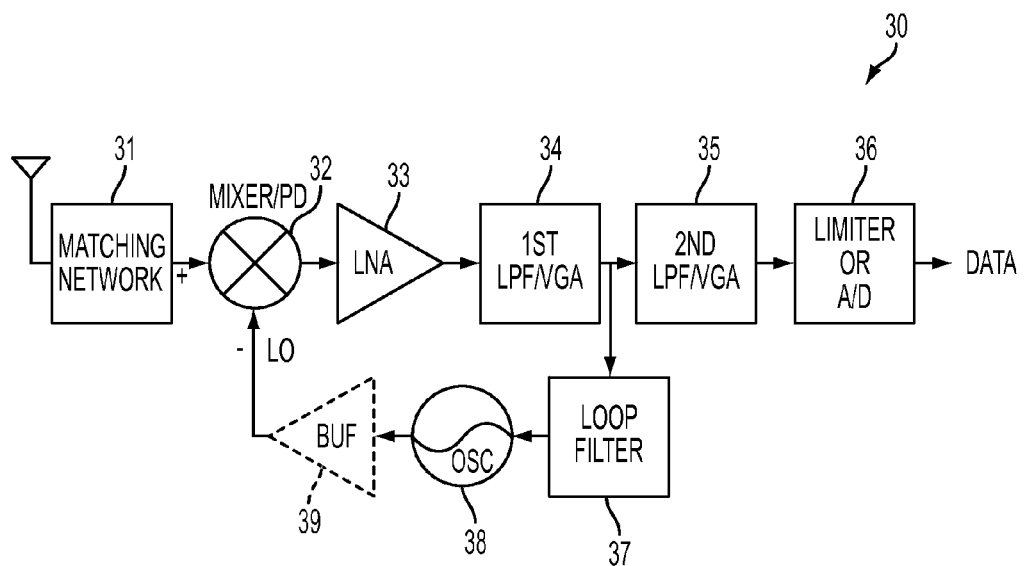
FIG. 3 shows an ultra low power radio receiver architecture of the invention based on phase locked loop.

An embodiment of the invention is directed to an ultra low power radio architecture that can detect the phase information of MSK signal. FIG. 3 shows an ultra low power radio receiver embodiment of the claimed invention that is based on a phase locked loop architecture in accordance with the claimed invention. The low power receiver 30 comprises an input matching network 31, Mixer/PD (phase detector) 32, LNA 33, a first LPF/VGA 34, a loop filter 37, an oscillator 38, and a buffer amplifier 39. The arrangement of these components, as set forth in FIG. 3, constitutes a phase locked loop architecture. In certain embodiments of the invention, a second LPF/VGA 35 may be optionally included for additional signal filtering and gain control. In an embodiment of the invention, a limiter or A/D converter 36 is used at the final receiving stage.

In an embodiment of the invention, an ultra low power receiver comprising a limiter is used for MSK signal detection. When this receiver is used for MSK signal detection, the use of a limiter alone is sufficient without the need for an analog-to-digital (A/D) converter.

In an embodiment of the invention, the receiver is used for FSK (frequency shift keying), GMSK (Gaussian minimum shift keying), or PSK (phase shift keying) signal detection. In such an embodiment, an A/D converter is often required because the waveform of the output data is not square wave when the input signal is FSK, GMSK or PSK.

In an embodiment of the invention, an ultra low power radio receiver based on a phase locked loop architecture is provided. Such a receiver is comparable to a mixer-first single path receiver chain with phase locked loop. This type of architecture provides an almost fifty percent power reduction compared to the conventional complex receiver architecture.

In most conventional receivers, the oscillator and buffer amplifier are used to provide the reference frequency signal from a local oscillator. However in an embodiment of the invention, the oscillator is primarily required to generate a single phase rather than complex phase, which in turn further lowers power consumption.

In accordance with an embodiment of the invention, the phase locked loop dynamics operate as set forth below:

$$T(s) = \frac{2/\pi \cdot A_{RX} \cdot H_{LPF}(s) \cdot s}{s^2 + K_{VCO} \cdot K_1 \cdot s + K_2 \cdot K_{VCO}} \quad (2)$$

where, $A_{RX}$ is the signal gain from LNA to $1^{st}$ LPF/VGA, $H_{LPF}(s)$ the first LPF frequency response, $K_{VCO}$ the oscillator gain, $K_1$ and $K_2$ are the proportional and integral parameters of the loop filter in phase locked loop.

Figure 4:
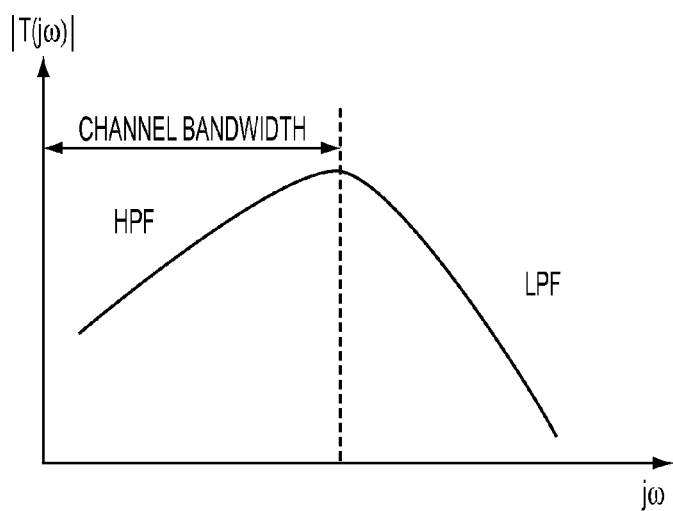
FIG. 4 shows the frequency response of an ultra low power radio receiver.

As shown in (2), the overall transfer function of the phase locked loop in an embodiment of the invention becomes a conventional second order band pass transfer function when $H_{LPF}(s)$ is assumed to be a flat frequency response. Thus, by controlling the parameters such as $K_{VCO}$, $K_1$, and $K_2$, the phase transfer function can be adjusted to provide high pass filtering property up to the edge of channel bandwidth. Above the channel bandwidth, the transfer function changes to low pass filtering function to reject interference and non-necessary harmonics, and allows the low pass filtering to become more sharp with first and second LPF as shown in FIG. 4.

In an embodiment of the invention, the output from an ultra low power receiver is a derivative of the input signal. For example, the high pass filtering function is provided by a differentiator; thus, the output signal of the radio receiver in an embodiment of the invention becomes a derivative of the input signal phase within the channel bandwidth. Thus, if the input signal is an MSK signal, the output signal becomes a square wave as shown in FIG. 2B. Thus, an embodiment of the invention permits the detection of a MSK modulated radio signal with the present invention of ultra low power radio receiver architecture.

Figure 5A:
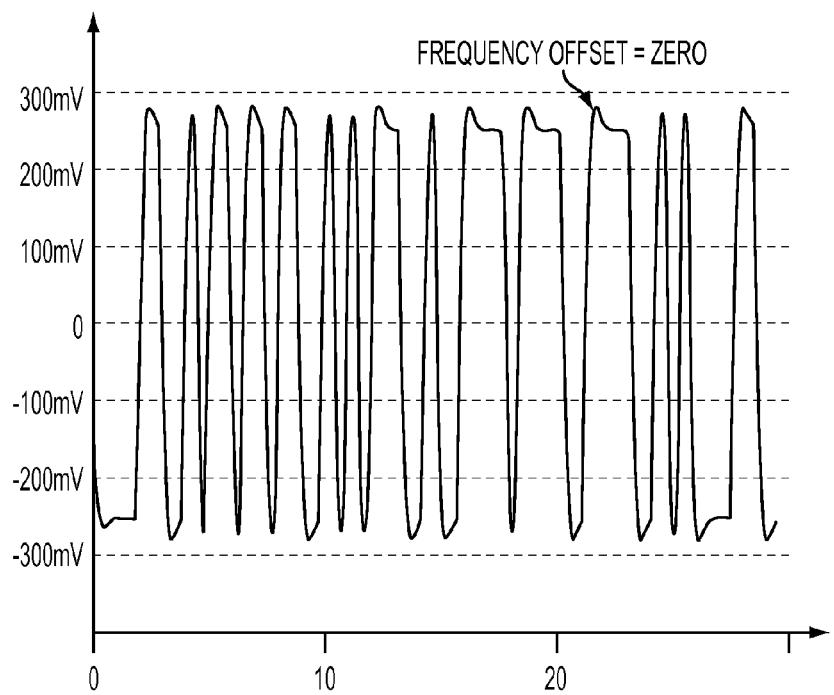
FIGS. 5A and 5B shows the output waveform with an ultra low power radio receiver architecture with zero frequency offset and 1.5 MHz frequency offset between MSK input signal and local oscillator frequency, respectively.
Figure 5B:
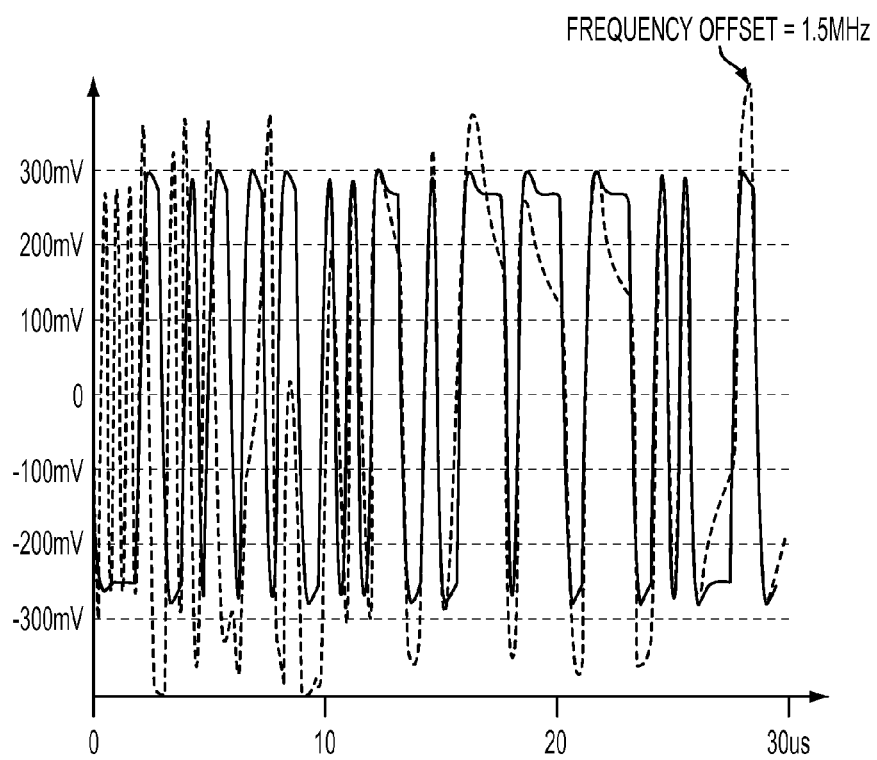

An embodiment of the invention further provides an important advantage, which is to mitigate the requirement of frequency reference stability of local oscillator frequency. The nature of phase locked loop in an embodiment of the invention can provide some of frequency offset tracking capability by incorporating the integrating function in the loop filter. FIGS. 5A and 5B show the simulation results using an ultra low power radio receiver based on phase locked loop. As shown in FIG. 5A, when the input MSK signal and local oscillator has no frequency offset, the output data waveform shows a good shape of square wave which is the slope of the input MSK modulated signal. FIG. 5B shows the system simulation result with 1.5 MHz frequency offset between the input MSK carrier frequency and the local oscillator reference frequency, where the simulation results with 1.5 MHz frequency offset is overlapped with the simulation results with zero frequency offset. As shown in FIG. 5B, as the simulation time approaches around 10μ second, the output wave form overlap one another, indicating that the MSK signal with 1.5 MHz frequency is detectable by a radio receiver architecture based on phase locked loop. For this simulation, a 2.4 GHz carrier frequency is used. The requirement of the reference frequency stability is equal to 625 ppm, which is around 7.5 times larger than the requirement defined in the IEEE 802.15.4 standard.

Embodiments of the present invention of radio receiver architecture can be applied to other radio standards that use the modulation scheme such as the Gaussian Minimum Shift Keying (GMSK), the Frequency Shift Keying (FSK), the Phase Shift Keying (PSK), etc.

In certain embodiments of the invention, the architecture of the receiver can be modified in accordance with the contemplated uses.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

What is claimed is:

1. A receiver that decodes data from an analog signal, the receiver comprising:
a matching network component that is connected to a mixer/phase detector component, the mixer/phase detector component being connected to a first amplifier component, wherein the first amplifier is a low noise amplifier, the first amplifier being connected to a first filter/amplifier component, the first filter/amplifier component being connected to a filter component, an oscillator that is connected to the filter component, a second amplifier that is connected to the oscillator, and an analog-to-digital converter, wherein the converter digitizes the signal and wherein the mixer/phase detector component, first amplifier component, first filter/amplifier component, filter component, and oscillator are arranged in a loop, wherein the oscillator generates a single phase, wherein the receiver is a single path ultra low power receiver comprising a limiter, wherein the receiver provides phase and frequency of received signals, wherein the receiver is used for FSK, GMSK or PSK signal detection without the need for an analog-to-digital converted, and wherein the arrangement of the components forms a phase locked loop architecture which provides frequency offset tracking capability and mitigates the requirement of frequency reference stability.

2. The receiver of claim 1, further comprising a second filter/amplifier component that is connected to the second amplifier.

3. The receiver of claim 2, further comprising a limiter component that is connected to the second filter/amplifier component.

4. The receiver of claim 1, wherein the first filter/amplifier component comprises a low pass filter and a variable gain amplifier.

5. The receiver of claim 1, wherein the filter is a loop filter.

6. The receiver of claim 1, wherein the second amplifier is a buffer amplifier.

7. The receiver of claim 1, wherein the loop filter receives an input signal.

8. The receiver of claim 7, wherein the input signal is selected from the group consisting of first LPF/VGA output, second LPF/VGA output or limiter output.

9. The receiver of claim 5, wherein the loop filter is an amplifier-based loop filter or charge-pump based loop filter.

10. A method of decoding data from an analog signal, the method comprising: (i) receiving the analog signal; (ii) amplifying the analog signal; and (iii) converting the analog signal into a digital signal using a receiver that decodes data from an analog signal, the receiver comprising: a matching network component that is connected to a mixer/phase detector component, the mixer/phase detector component being connected to a first amplifier component, wherein the first amplifier is a low noise amplifier, the first amplifier being connected to a first filter/amplifier component, the first filter/amplifier component being connected to a filter component, an oscillator that is connected to the filter component, a second amplifier that is connected to the oscillator, and an analog-to-digital converter, wherein the converter digitizes the signal and wherein the mixer/phase detector component, first amplifier component, first filter/amplifier component, filter component, and oscillator are arranged in a loop, wherein the oscillator generates a single phase, wherein the receiver is a single path ultra low power receiver comprising a limiter, wherein the receiver provides phase and frequency of received signals, wherein the receiver is used for FSK, GMSK or PSK signal detection without the need for an analog-to-digital converter, and wherein the arrangement of the components forms a phase locked loop architecture which provides frequency offset tracking capability and mitigates the requirement of frequency reference stability.

11. The method of claim 10, wherein the signal is a FSK, GMSK or PSK signal.

12. A method of decoding data from an analog signal, the method comprising: (i) receiving the analog signal; (ii) amplifying the analog signal; and (iii) converting the analog signal into a digital signal using a receiver that decodes data from an analog signal, the receiver comprising: a matching network component that is connected to a mixer/phase detector component, the mixer/phase detector component being connected to a first amplifier component, wherein the first amplifier is a low noise amplifier, the first amplifier being connected to a first filter/amplifier component, the first filter/amplifier component being connected to a filter component, an oscillator that is connected to the filter component, a second amplifier that is connected to the oscillator, and an analog-to-digital converter, wherein the converter digitizes the signal and wherein the mixer/phase detector component, first amplifier component, first filter/amplifier component, filter component, and oscillator are arranged in a loop, wherein the oscillator generates a single phase, wherein the receiver is a single path ultra low power receiver comprising a limiter, wherein the receiver provides phase and frequency of received signals, wherein the receiver is used for FSK, GMSK or PSK signal detection without the need for an analog-to-digital converter, and wherein the arrangement of the components forms a phase locked loop architecture which provides frequency offset tracking capability and mitigates the requirement of frequency reference stability and further comprising a limiter component that is connected to the second filter/amplifier component.

13. The method of claim 12, wherein the signal is a MSK signal.

\* \* \* \* \*